Dec. 3, 1968  SHUJI KIMURA  3,414,209

FILM WINDING MECHANISM FOR CAMERAS

Filed Jan. 31, 1967

3,414,209
FILM WINDING MECHANISM FOR CAMERAS
Shuji Kimura, Tokyo, Japan, assignor to Nippon Kogaku K.K., Tokyo, Japan, a corporation of Japan
Filed Jan. 31, 1967, Ser. No. 612,955
Claims priority, application Japan, Feb. 5, 1966, 41/9,488
5 Claims. (Cl. 242—71.5)

ABSTRACT OF THE DISCLOSURE

Film winding mechanism for cameras including a ratchet wheel having spaced gaps mounted on the film winding shaft. A film advancing lever, mounted on the shaft, charges a spring during film advance and is thereafter returned to its initial position. The spring has an offset portion which engages a tongued flange on the winding flange at said initial position.

---

This invention relates to film winding mechanism for cameras.

The present invention provides a film winding mechanism for cameras wherein the film winding lever is securely held in its initial or home position and assures the positive and accurate advance of the film one frame upon operation by including a sliding contact leaf spring cooperating with the lever shaft secured to the lever and providing a ratcheting arrangement mounted rotatably in unison with the lever wherein idle portions or gaps are formed in the ratchet teeth, the gaps being angularly spaced apart a distance equivalent to the degree of rotation of the winding lever shaft to advance the film one frame, while the ratchet pawl or pawls engage the ratchet wheel gaps when the film winding lever is in its home position.

In present film winding mechanisms for cameras, there is considerable play between the film winding lever and the shaft on which the take-up film spool is mounted which results from the spring pawl connection between the lever and the shaft. with this play between lever and shaft, the winding lever is not held securely in its initial or home position and during the course of the film winding operation. Under such circumstances, the operation of the film winding lever through its full stroke to advance the film will not always advance the film a full frame, and in certain instances will advance the film a little more than the full frame.

The object of the present invention is to provide a film winding mechanism for cameras which comprises few and simple parts, wherein the film winding lever is held in its home position and when the lever is moved from its home position to advance the film and thereafter released, the lever is held at its film advance position, the pawl and ratchet interconnection between the film winding lever and take-up spool shaft insuring a positive drive at all times and an accurate advance of the film one frame each time the film winding lever is moved through an operating stroke.

The advantages and features of the present invention will become more apparent from the following description of an illustrative embodiment in conjunction with the drawing in which.

Figure 1:
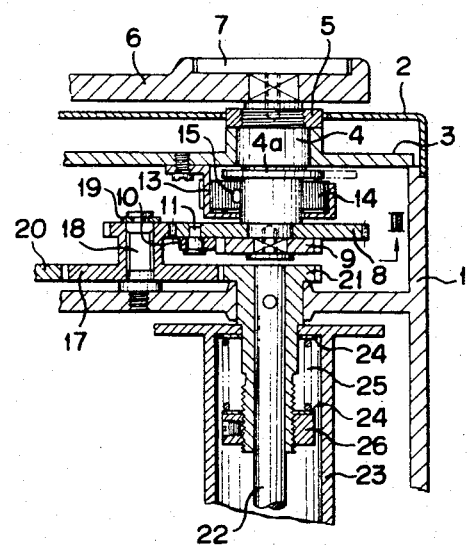
FIG. 1 is a cross-sectional view of an embodiment of the present invention.

Referring now in detail to the drawings, a camera body 1 is provided with a cover 2 and a mounting plate 3 fixed therein. Rotatably mounted through plate 3 is a film winding shaft 4 having secured thereto and rotatable therewith a tongued flange 4a having a subtended angle of $\beta$. Rotatably securing the shaft 4 to the camera body cover 2 is a mounting nut 5, a winding lever 6 being secured to the upper end of the winding shaft by a stop nut or screw 7. Rotatably mounted on winding shaft 4 is a gear 8 and juxtaposed the gear and secured to the winding shaft is a ratchet wheel 9. The ratchet 9 is provided with peripheral teeth, several of the teeth being omitted to provide a gap or idle portions 9a at inervals of 120° for example, the angle corresponding to the degree of rotation of the winding shaft 4 necessary to advance the film one frame.

Figure 3:
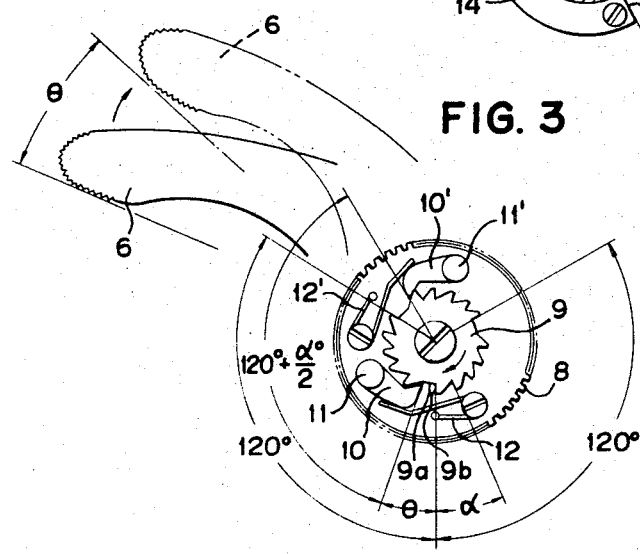
FIG. 3 is a bottom view of the ratchet arrangement as taken along line III of FIG. 1.

Rotatably mounted on the gear 8 are ratchet pawls 10, 10' as by stub shafts 11, 11' respectively. Referring to FIG. 3, it will be noted that the ratchet pawls 10, 10' are spaced apart at an angle of 120° plus $\alpha/2$, wherein $\alpha$ is equal to the base angle of a ratchet tooth. It is possible to provide a film winding mechanism according to the present invention without the ratchet pawl $10^1$. With the provision of ratchet pawl 10 alone, the pitch angle of the minimum film advance is equal to the angle $\alpha$. From a practical point of view, it is desirous to make the pitch smaller, but when the pitch is small the strength of the ratchet teeth is less. To overcome this disadvantage, the ratchet pawl $10^1$ is provided angularly spaced from the pawl 10 by 120° plus $\alpha/2$ to make the minimum pitch $\alpha/2$. It is thus possible to enlarge the size of the ratchet teeth for increased strength. It will be apparent that the angular displacement 120° plus $\alpha/2$ may be replaced by twice 120° plus $\alpha/2$.

Cooperating with the ratchet pawls 10, 10' are leaf springs 12, 12' respectively, biasing the pawls against the ratchet 9. It will be noted from FIG. 3 of the drawings, that an end 9b of the gap or idle portion 9a of the ratchet is so disposed with respect to a pawl tooth that abutment will be made as soon as the lever 6 and ratchet wheel 9 are moved from the home or initial position by an angle $\theta$ to initiate the film winding. It will be noted that ratchet wheel gaps 9a subtend the angle $\theta$ equal to the angle subtended by the offset bent portion 16a of a spring 16, as described hereinafter.

Figure 2:
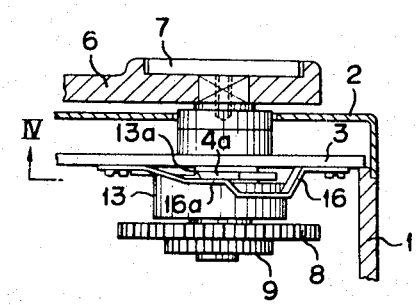
FIG. 2 is an enlarged view of a portion of FIG. 1.
Figure 4:
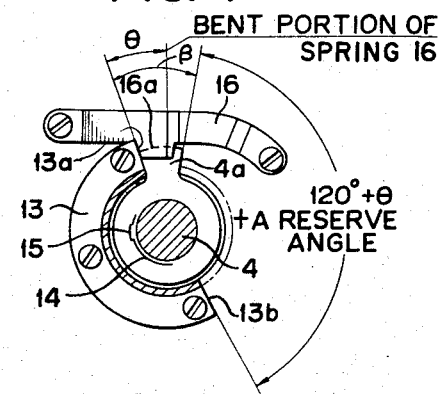
FIG. 4 is a bottom view along the line IV of FIG. 2 showing the retaining spring for the film advance lever.

Secured to the underside of plate 3 is a cup-shaped spring retainer 13, a portion of which is cut away to provide edges or stops 13a, 13b (FIG. 4) for the tongued flange 4a on shaft 4. As will hereinafter appear the angular distance between the stops 13a, 13b is equal to $120°+\theta+\beta$ (the angle subtended by the flange 4a) + a reserve angle. It is to be noted that this reserve angle is necessary for compensating working error but in theoretical point of view it is unnecessary to provide. A coil spring 14 is wound about the shaft 4 within the retainer 13, the outer end being secured to the retainer while the inner end is secured to a pin 15 on the winding shaft. Also secured to the underside of plate 3, is a leaf spring 16 fastened at both ends and crimped to form an extending offset, tongue portion 16a which is so designed that it resiliently but securely engages the tongued flange 4a on shaft 4 (FIGS. 2 and 3) when the winding lever 6 is in its home position but it prevents the tongued flange 4a from coming up thereonto when the winding lever 6 is moved to a position to advance the film.

The film winding mechanism of the present invention further included an intermediate dual gear 17 rotatably mounted on a shaft 18 and secured thereon by a clip 19, or the like, and meshing with the gear 8. Meshing with gear 17 is a gear 20 forming a part of the shutter mechanism of the camera (not shown) and a spool gear 21 secured to a spool shaft 22 suitably mounted for rotation within the camera body 1. Secured to the shaft 22 is a film spool 23 as by washer 24, friction spring 25 and friction adjusting nut 26.

When the lever 6 is rotated clockwise in the direction of the arrow in FIG. 3 from a homing position, through an angle $\theta$, the pawl 10 will be engaged by the end portion 9b of the ratchet 9 which is rotated by the lever by an angle $\theta$, to rotate the gear 8 through the same angle $\theta$. As noted from FIG. 4, the rotation of shaft 4 will rotate the tongued flange 4a out of engagement with the offset tongued portion 16a of the spring 16 to permit the relatively free rotation of the winding lever 6. Continued rotation of the lever 6 to advance the film one frame, or as in the example given, for 120°, will continue to rotate the gear 8 through ratchet 9 to rotate gear 20 to charge the shutter mechanism and to rotate the film spool 23. During the film advance, the spring 14 will be charged. The edge or stop 13b on the spring retainer serves as a limit stop for the advancing rotation of shaft 4, the tongued flange 4a abutting the stop should too much pressure be applied to the lever 6.

Upon completion of the film advance operation, the release of the lever 6 will permit the charged spring 14 to return the shaft 4, lever 6 and ratchet 9 only to positions departed from their respective initial positions by the angle $\theta$, but at which positions those members are stopped since the tongued flange 4a on the shaft 4 is stopped by the one end of the offset spring portion 16a. This is very convenient in operation. When the lever 6 is in its home position it does not project from the back surface of the camera body, however, in accordance with the present invention, when the lever is moved from its initial or home position to advance the film and thereafter released it will be stopped at a position departed from its home position by the angle $\theta$, i.e. the lever is stopped at a position projected from the back surface of the camera body by the angle $\theta$, an operator can easily and successively make winding operations of the film using his thumb without moving the lever from its home position at every winding operations. The pawls 10, 10' will pass over the ratchet teeth during the return of the lever 6 and drop into the next gap 9a of the ratchet teeth in preparation for the next film advance operation.

When the lever 6 is forced to move to its home position from its film advance position, which is the position departed from its home position by the angle $\theta$, the tongued flange 4a climbs up the offset spring portion 16a of the spring 16 and abuts to the edge or stop 13a on the spring retainer 13 and assures that the lever is thus firmly retained in its home position by the bias of the spring 16 and the stop 13a. By providing an angular spacing between the two pawls equivalent to the degree of rotation required to advance the film one frame (120°) plus a half tooth angle, a positive engagement of either one or the other of the pawls is assured during film advance, and the advance of the film exactly one frame (120°) becomes a certainty. Furthermore, since the space between two teeth corresponding to the positions of two pawls 10 and 10', respectively, is 120° plus a tooth angle $\alpha$, the positions of two pawls 10 and 10' relative to the corresponding teeth deviate by $\alpha/2$, and consequently, it is possible, if desired to advance the film a small amount of $\alpha/2$ without increasing the number of teeth, i.e. without making a pitch between adjacent teeth to be small. And the angular pitch between gaps 9a is determined by equally dividing $360° \times N$ (N is an optional number) with respect to an angle corresponding to the degree of rotation of the winding shaft necessary to advance the film one frame. In the illustrative embodiment, the angular pitch between gaps 9a is 120°.

There is thus provided by the present invention, a film advancing mechanism comprising few and single parts, at the same time providing a positive and accurate mechanism for advancing the film exactly one frame, and wherein the winding lever 6 is unitary made with the shaft 4 and is held in its initial or home position in a secure manner with the aid of a bias spring, which nevertheless permits the movement of the lever by positive action during a film advance operation. It will be appreciated that the degree of rotation of the winding lever is not limited to an angle of 120° corresponding to one frame of the film, and the ratchets of multi-stage can be used. It is not always necessary to advance the film one frame with a small transmitting pitch, and the transmitting pitch thereof is not to be restricted to $\alpha/2$, and consequently, when it is not necessary to carry out the advance of the film with a small pitch, the ratchet which is prepared by forming the predetermined tooth missing portion in a disc can be employed.

What is claimed is:

1. Film winding mechanism for a camera wherein a take-up film spool is mounted on a shaft rotatable through a gear train with the shutter charging mechanism of the camera by a film winding lever and shaft, comprising a gear forming a part of the gear train and rotatably mounted on the film winding shaft, a ratchet wheel secured juxtaposed the gear on the film winding shaft, said ratchet wheel having peripheral teeth separated by idle portions or gaps spaced apart an angular distance equivalent to the required degree of rotation of the advancing shaft to advance the film one frame, pawl means pivotally supported on the gear and adapted to engage a ratchet gap of the ratchet wheel when the film advance lever is in its initial or home position, resilient means including a spring which is in sliding contact with the winding shaft to retain the lever in its home position but prevents the lever and shaft from returning to the home position once a film advancing operation is made.

2. Film winding mechanism according to claim 1, wherein the pawl means comprises at least two ratchet pawls spaced apart an angular distance equivalent to the required degree of rotation of the film winding shaft to advance the film one frame plus the angular distance of half a ratchet tooth.

3. Film advancing mechanism according to claim 1, wherein a tongued flange is secured to the film winding shaft and a leaf spring is fixed within the camera and formed with an offset portion which is in sliding contact with the tongued flange when the winding lever and shaft are in the home position but prevents the winding lever and shaft from returning to home position once a film advance operation is made.

4. Film advancing mechanism according to claim 2, wherein a tongued flange is secured to the film winding shaft and a leaf spring is fixed within the camera and formed with an offset portion which is in sliding contact with the tongued flange when the winding lever and shaft are in home position but prevents the winding lever and shaft from returning to home position once a film advance operation is made.

5. Film winding mechanism according to claim 3, wherein means is provided for returning the film advancing lever and shaft toward the home position comprising a fixed spring retainer, a coil spring within the retainer having one end secured to the shaft and the other end to the retainer, said retainer having a cut-away portion adjacent the tongued flange, the edges of the retainer forming stops adapted to be abutted by the tongued flange in extreme positions thereof.

References Cited

UNITED STATES PATENTS

| | | | |
|---|---|---|---|
| 1,946,855 | 2/1934 | Horns | 242—71.5 |
| 2,282,075 | 5/1942 | Mihalyi | 242—71.5 |

FRANK J. COHEN, *Primary Examiner.*

N. L. MINTZ, *Assistant Examiner.*